June 26, 1962 M. BIDLINGMAIER ETAL 3,041,532
SELECTIVE VOLTAGE OUTPUT MEASUREMENT
Filed July 31, 1959 3 Sheets-Sheet 1

Inventors.
Meinard Bidlingmaier,
Hans Schittko, &
Alfred Manfreda.
By [signature] Atty.

June 26, 1962 M. BIDLINGMAIER ETAL 3,041,532
SELECTIVE VOLTAGE OUTPUT MEASUREMENT
Filed July 31, 1959 3 Sheets-Sheet 2

Inventors.
Meinard Bidlingmaier,
Hans Schittko, &
Alfred Manfreda.
By [signature] Atty.

United States Patent Office 3,041,532
Patented June 26, 1962

3,041,532
SELECTIVE VOLTAGE OUTPUT MEASUREMENT
Meinrad Bidlingmaier, Hans Schittko, and Alfred Maufreda, all of Munich, Germany, assignors to Siemens & Halske Aktiengesellschaft Berlin and Munich, a corporation of Germany
Filed July 31, 1959, Ser. No. 830,939
Claims priority, application Germany Aug. 22, 1958
6 Claims. (Cl. 324—57)

This invention is concerned with an arrangement for effecting selective voltage output measurements wherein a measuring voltage with adjustable frequency, produced by a variable frequency transmitter, is after passing through a test object frequency-selectively evaluated in a heterodyne receiver. The invention is accordingly concerned with an arrangement for measuring the frequency characteristics of test objects, for example, transmission systems.

In such measuring arrangements, the variable measuring frequency is in the heterodyne receiver converted into a constant intermediate frequency and conducted to the evaluation device by way of a suitable band filter. However, in known arrangements, the constancy of the intermediate frequency is relatively low, due to undesired frequency variations of the measuring frequency, for example, as a consequence of voltage variations in the commerical current source as well as variations of the frequencies of the auxiliary oscillators required in the heterodyne receiver, so that the pass range of the band pass filter must be dimensioned wide enaugh to secure undisturbed passage of the intermediate frequency therethrough. This results in the considerable disadvantage that, due to the wide pass range, a relatively broad noise voltage spectrum is conducted to the evaluation device of the heterodyne receiver, whereby an upper limit is set for the measuring range in the case of measuring strong damping with received measuring voltages of low amplitudes.

It is, however, with a view of cross-talk damping measurements, non-linearity measurements, interference voltage measurements, damping measurements on filters, etc., desirable to increase the sensitivity of the known arrangements for the selective output level measurement to such extent, that these measurements of strong damping values can be carried out with the accuracy possible in the measuring of slight damping values.

The present invention proposes to solve the problems involved by advantageously increasing the frequency constancy of the output level transmitter and that of the auxiliary oscillators employed in the heterodyne receiver, and therewith that of the intermediate frequency, such that the pass range of the band pass filter can be considerably narrower, thereby making the heterodyne receiver more selective or reducing its noise level, respectively.

In accordance with the invention, the arrangement for selectively measuring the output level, wherein a measuring frequency is after passing through a test object frequency-selectively evaluated in a heterodyne receivr, provides for the generation of the first frequency of the variable frequency transmitter a first transmitter oscillator which is, preferably automatically, adjustable to a selected raster frequency of a quartz controlled frequency raster, while providing for the generation of the second frequency which differs from the first one by the measuring frequency, a second frequency controlled transmitter oscillator which is detuneable by the amount of the raster spacing, and converting the measuring frequency in the heterodyne receiver, in a first conversion stage whose auxiliary oscillator frequency is identical with the prevailing raster frequency of the first transmitter oscillator, or identically produced, into a band with the width of the raster spacing, and thereafter converting it in a successive second conversion stage the auxiliary oscillator frequency of which is produced in the same manner as the frequency of the second transmitter oscillator or derived therefrom, into a quartz controlled constant frequency which is conducted to the evaluation device by way of a band pass filter with narrow pass range.

As a result of the construction and arrangement as well as of the cooperation of the oscillators at the transmitter side and receiver side, according to the invention, the received measuring frequency is conducted to the evaluation device undisturbed, even in the case of a pass range of the intermediate frequency band pass filter in the heterodyne receiver which is considerably narrower than in heretofore known arrangements for the selective output level measurement, thereby obtaining a considerable extension of the measuring range for low amplitudes of the received measuring voltage or for strong damping measuring values, respectively. The construction of the output level transmitter as a variable frequency transmitter results in a wide frequency range which can be tuned through without any range switching.

The various objects and features of the invention will appear from the description of a preferred embodiment which will be rendered below with reference to the accompanying drawings. In the drawings, FIG. 1 shows a variable frequency transmitter which may be used according to a prior proposal for generating a continuously adjustable transmission frequency of high constancy within a wide frequency range;

Figure 1:
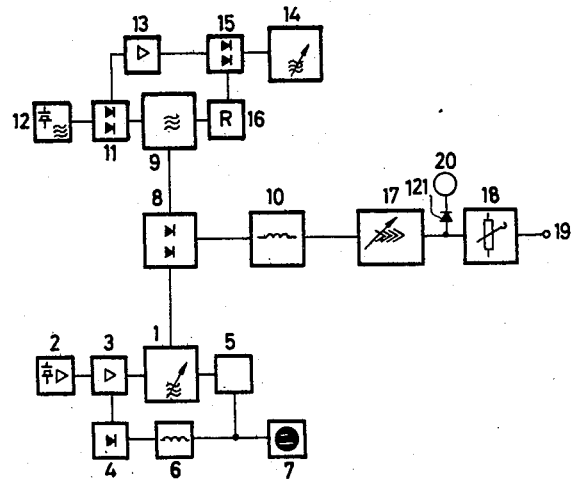

Referring now to FIG. 1, th transmitter oscillator which may be tuned through and which is constructed to lock to the harmonic waves of the basic quartz frequency formed by distortion in the quartz generator device 2, delivers its voltage by way of a (non illustrated) separation stage of the mixer stage 3, at the second input of which is disposed the "quartz raster," that is, the harmonic waves of the basic quartz frequency. The output of the mixer stage 3 is connected by way of a wide band amplifier, for example R-C amplifier (not shown), to the rectifier stage 4 which by way of the low pass filter 6 feeds the device 5 for the corrective tuning of the frequency of the transmitter oscillator 1.

The operation of this circuit part which constitutes for the variable frequency transmitter the "variable oscillator" can be explained as follows:

When the frequency of the first oscillator 1 is changed, for example manually, so that it approaches the harmonic of the basic frequency to which it is to be tuned, there will appear a first mixed frequency at the output of the modulation stage 3 resulting from the mixing of the individual harmonics of the basic frequency. The magnitude of this first mixed frequency corresponds to that of the basic frequency. There also will appear at the output of the modulation stage 3 a second mixed frequency, from the mixing of the first output signal, which coincides as to frequency with a harmonic, and the two neighboring harmonics, such second mixed frequency distinguishing from the first mixed frequency merely in its phase position. Accordingly, both mixed frequencies can be represented by two voltage vectors which distinguish one from the other by a certain phase angle, the phase difference therebetween representing a very accurate criterion for the actual correspondence of the first output signal and the desired harmonic. There will thus appear, at the output of the modulation stage 3, a voltage with the basic frequency, the amplitude of which depends upon the quality of this correspondence. This voltage is rectified in a rectifier 4, the rectified voltage passing through a low pass filter 6 and being conducted, as a regulation voltage, to a frequency determining element or member 5, for example, a reactance tube of the oscillator 1. The corrective regulation by this regulation voltage is operative to adjust the frequency of the first output signal of the oscillator 1 to the value of the selected harmonic.

In case there is a frequency difference between the frequency of the first output signal and the next adjacent harmonic, there will appear at the output of the modulation stage 3 an alternating voltage with a frequency corresponding to this frequency difference. This alternating voltage is extended to the low pass filter 6, over the rectifier 4 which has a sufficiently small time constant, passes through this low pass filter, and effects a frequency modulation of the first output signal by acting upon the frequency determining member 5. The result is that the oscillator 1 is held at (locked to) the desired harmonic, by the action of the switching elements 3, 4, 6 and 5, at the instant at which the frequency to be adjusted comes sufficiently close to such harmonic.

The voltage rectified by the rectifier 4, which characterizes the "locked-in" condition and which is as a regulation voltage extended to the frequency determining element 5, can be simultaneously extended to an indicating or signalling device 7 so as to effect an optical indication of the "locked-in" condition. The device 7 contains suitably a lamp for indicating this condition.

The output signal of the first oscillator 1 is conducted to one input of a modulator 8, to the other input of which is conducted a second output signal produced by the oscillator 9. Both output signals are mixed and the difference frequency is filtered out at the output of the modulator 8 by means of a low pass filter 10.

It is possible, with selective adjustment of the frequency of the first output signal of the oscillator 1 to a series of harmonics of a basic frequency and simultaneous alteration of the frequency of the second output signal of the oscillator 9, by an amount corresponding to the frequency spacing of two neighboring harmonics, to effect continuous scanning of a frequency range determined by the number of the used harmonics, by the difference frequency appearing at the output of the modulator 8.

An embodiment of the invention is dimensioned as follows: The output frequency of the oscillator 1 may be tuned within a range from 21.1 megacycles to 37.1 megacycles, and may be selectively adjusted to any desired harmonic of its quartz controlled fundamental frequency of 100 kilocycles. The indicated frequency range embraces thereby a total of 161 harmonics including the limit frequencies of 21.1 megacycles and 37.1 megacycles. The oscillator 9 is continuously adjustable in a frequency range from 21.0 megacycles to 21.1 megacycles. The difference frequency formed in the modulator 8 is, depending upon the adjustment of the oscillators 1 and 9 continuously tunable within a frequency range which extends theoretically from a lower limit frequency of 0 cycles to an upper limit frequency of 16.1 megacycles. The lower limit frequency of 0 cycles will be obtained by adjustment of the oscillator 1 to the lowest harmonic within its adjusting range, that is, to 21.1 megacycles, and simultaneous adjustment of the oscillator 9 to its upper range limit, that is, likewise 21.1 megacycles. The upper limit frequency of 16.1 megacycles results on the other hand by the adjustment of the oscillator 1 to the harmonic of 37.1 megacycles and simultaneous adjustment of the oscillator 9 to its lower range limit of 21.0 megacycles. It may be for practical reasons advantageous to place the lower limit frequency at about 10 kilocycles, in which case the oscillator 1 is tuned to 21.1 megacycles while the oscillator 9 is tuned to 21.09 megacycles. All intermediate frequency values between the lower and upper limit frequency can thereby be obtained, by the rough tuning of the oscillator 1, to any harmonic, and by fine tuning of the oscillator 9 in the sense of an interpolation, to the respectively adjacent harmonic.

The frequency constancy of the transmitter oscillator 9 is secured as follows:

The output frequency of the transmitter oscillator 9 is brought to a low intermediate frequency, for example, by a modulation device 11 and a quartz controlled generator 12, which is after amplification in an amplifier device 13 compared with a low auxiliary frequency produced in an interpolation oscillator 14. The frequency of the interpolation oscillator 14 is likewise variable by the raster spacing. A matching of the low intermediate frequency appearing at the output of the amplifier device 13 with the respective output frequency of the interpolation oscillator 14 is suitably carried out by conducting both voltages to a circuit 15 which in turn conducts a corrective regulation voltage corresponding to the occurring frequency deviations to a frequency determining element 16 of the transmitter oscillator 9. The intermediate frequency produced in the modulation device 11 is thereby "held" to the value of the respective adjusted output frequency of the interpolation oscillator 14, and the output frequency of the transmitter oscillator 9 is thereby at the same time stabilized, since the frequency constancy of the transmitter oscillator 9 is traced back to the considerably greater absolute frequency constancy of the low frequency interpolation oscillator 14.

The circuit 15 preferably consists of a phase dependent rectifier which produces a direct regulation voltage dependent upon the phase difference of the two frequencies to be compared, such regulation voltage being conducted to the frequency determining element 16 of the transmitter oscillator 9, consisting, for example, of a reactance tube. The reactance tube thereby affects the oscillator so that the alternating voltages on the phase dependent rectifier remain in phase. In case the output frequency of the transmitter oscillator 9 does not have its desired value, upon starting the operation of the apparatus, an alternating voltage is conducted from the phase dependent rectifier 15 to the frequency determining element 16, which effects a frequency modulation of the high frequency oscillator 9 and causes such oscillator to "lock in" responsive to passing the desired frequency.

The lower side frequencies produced in the modulation device 8 upon joining the output frequencies of the transmitter oscillators 1 and 9, are passed through the low pass filter 10, amplified in a successive, preferably variable amplifier 17, and thereafter conducted to output terminals 19 suitably by way of a calibration line 18 provided for the calibration of the output amplitude. A measurement or control of the magnitude of the output level can be effected by means of an instrument 20 connected in series with a rectifier 121.

In accordance with a further embodiment, the quartz controlled generator 12 provided in the corrective tuning circuit of the transmitter oscillator 9 which is detuneable by the raster spacing, may be omitted and a suitable raster frequency may be derived from the quartz generator device 2, for the production of the intermediate frequency, such raster frequency being suitably filtered out and amplified. Even the slight frequency variations of the quartz generators 2 and 12 are thereby excluded so that there will now result in the "fixed" as well as in the "variable" transmitter oscillator part only a change in identical sense. The frequency constancy of the entire transmitter arrangement can thereby be further increased.

Figure 2:
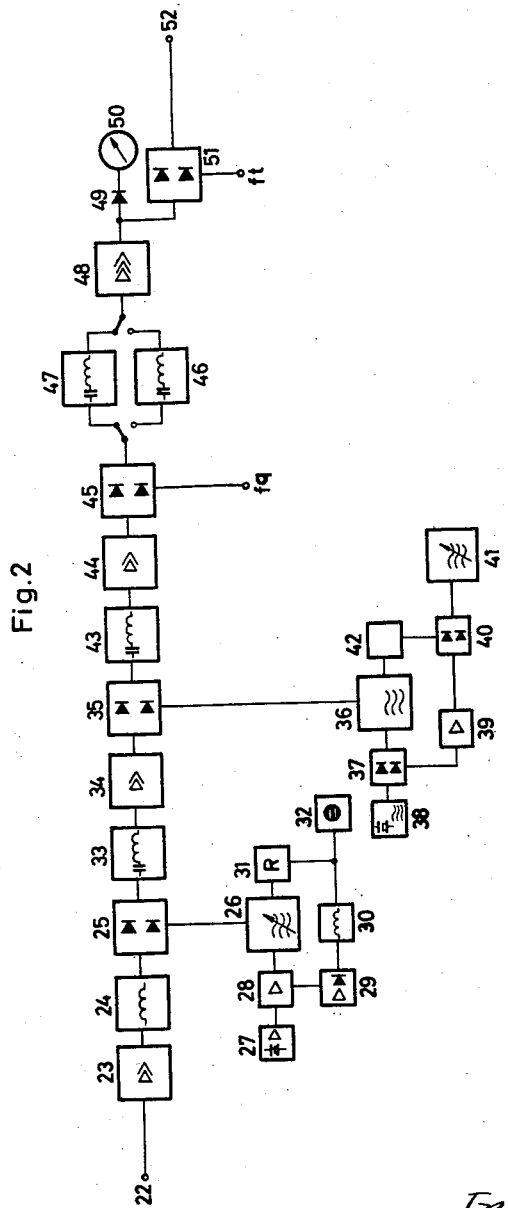
FIG. 2 illustrates the selective heterodyne receiver.

The voltage with constant output amplitude appearing at the output terminals 19 of the transmitter arrangement is conducted to the object 21 to be measured (FIG. 3) and after passing therethrough is conducted to the input terminals 22 of the selective heterodyne receiver which is schematically illustrated in FIG. 2.

The incoming measuring frequency is in the heterodyne receiver conducted by way of voltage dividers (not shown), serving as measuring range switches, and by way of a separation amplifier 23 and a low pass filter 24, the limit frequency of which lies above the upper limit of the measuring range, to a first conversion stage 25, at which is effected the conversion to a first intermediate frequency. For generating the required auxiliary oscillator frequency, there is according to the invention provided a circuit arrangement containing an auxiliary oscillator 26 which corresponds to the "variable" transmitter oscillator parts 1 to 7 shown in FIG. 1. The construction and operation of the auxiliary oscillator 26, quartz generator 27, mixing stage 28, rectifier stage 29, low pass filter 30, corrective tuning device 31 and indicating device 32, correspond to those of the respective elements 1 to 7 in FIG. 1.

It is accordingly possible to cause the auxiliary oscillator 26, which can be tuned through, to "lock" to the same raster frequency as the quartz generator device 27, just as the transmitter oscillator 1 locks with respect to the quartz generator device 2 (FIG. 1), so that the received measuring frequency is by means of the conversion stage 25 upon extraction of the produced lower side band by a band filter 33, converted to a frequency-wise fixed first intermediate frequency band the width of which corresponds to the raster spacing of the frequency raster produced by the respective quartz generator arrangement 27 and 2. The position of the measuring frequency within the first intermediate frequency band depends thereby upon the setting or adjustment of the interpolation oscillator 14.

In accordance with the invention, the first intermediate frequency is by way of a separation amplifier 34, serially following the band filter 33, conducted to a second conversion stage 35 which is affected by an auxiliary oscillator frequency delivered by an auxiliary oscillator 36, such auxiliary oscillator 36 being detuneable by the raster spacing. The auxiliary oscillator corresponds structurally and operationally to the second transmitter oscillator 9 (FIG. 1) which is detuneable by the raster spacing, while the modulation arrangement 37, the quartz controlled generator 38, the amplifier device 39, the phase dependent rectifier circuit 40, the interpolation oscillator 41 and the frequency determining element 42 correspond to similar switching parts respectively designated in FIG. 1 by numerals 11 to 16. It is merely to be observed that the frequency delivered by the auxiliary oscillator 36 to the conversion stage 35 differs from the output frequency delivered by the second frequency controlled transmitter oscillator 9 by an amount corresponding to the second intermediate frequency appearing at the output of the conversion stage 35.

The second intermediate frequency produced in this manner and appearing at the output of the conversion stage 45 is with identical setting of the interpolation oscillators 41 and 14 independent of the prevailing measuring frequency and therefore can be conducted, by way of a band filter 43, to the evaluation device of the heterodyne receiver. The second intermediate frequency can be suitably conducted by way of an amplifier 44 to a modulator 45 which effects by means of an accurate quartz-determined auxiliary frequency $fq$ a further displacement of the second intermediate frequency into a frequency position favorable for the evaluation. A switch is connected with the output side of the modulator 45 for selectively switching to a band filter 46 with a pass range corresponding to that of the band pass filter 43 or to a band filter 47 with extremely narrow pass range, and a further switch is provided for conducting the output voltage from either band pass filter 46, 47 to an amplifier arrangement 48 which either feeds by way of a rectifier 49 an indicating device 50 or by way of a further modulator arrangement 51, which is affected by an auxiliary frequency $ft$, to output terminals 52 for audio frequency evaluation, for example, by means of an ear phone.

The great frequency accuracy of the arrangement according to the invention may be explained as follows:

The quartz accuracy of the first "variable" transmission oscillator 1 (FIG. 1) is secured by the possibility of locking to a desired raster frequency of the quartz-accurate frequency raster produced by the quartz generator arrangement 2. As noted before, the desired raster frequency is a harmonic wave of the basic quartz frequency. The same frequency accuracy is obtained for the second "fixed" transmission oscillator 9 of the variable frequency transmitter, by converting its output frequency in a corrective tuning branch, by means of a modulation device 11, into a considerably lower intermediate frequency which is continuously matched to the frequency of the low frequency interpolation oscillator 14. The relatively low output frequency of the interpolation oscillator 14 can with known means be held constant with the same accuracy as the output frequency of the first transmitter oscillator. The measuring frequency conducted from the transmitter arrangement to the object to be measured and from there to the measuring receiver, resulting as difference frequency of the frequencies delivered by the transmitter oscillators 9 and 1, will accordingly likewise exhibit quartz accuracy. Since the auxiliary frequencies conducted in the heterodyne receiver to the conversion stages 25 and 35 are produced in identical manner, therefore being frequency controlled just as the output frequencies of the transmitter oscillators 1 and 9, it follows, that the intermediate frequency appearing at the output of the conversion stage 35 will exhibit quartz accuracy which is preserved even after a further conversion by means of a quartz-accurate auxiliary frequency $fq$ in the modulator 45. It is accordingly possible to conduct the intermediate frequency by way of the band filter 47, with extremely narrow pass range, to the evaluation device 50, 52 without incurring at the flanks of the band filter, due to undesired fluctuations of the intermediate frequency, disturbing damping affects for the measuring voltages which might falsify the measuring results.

Figure 3:
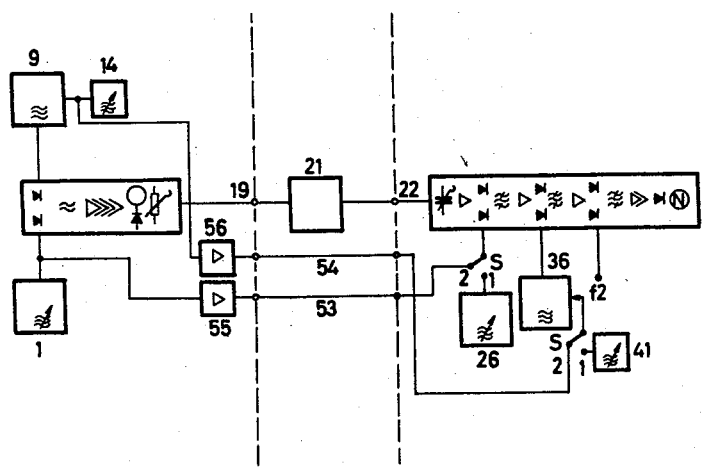
FIG. 3 shows full synchronization of the heterodyne reciver with the output level transmitter.

In the embodiment according to FIG. 2, the heterodyne receiver is tuned to the received measuring frequency by the principal setting or adjustment of the auxiliary oscillator 26 as well as by the fine adjustment of the interpolation oscillator 41. In accordance with a further feature of the invention, a far reaching service and operation simplification is obtained by fully synchronizing the heterodyne receiver with the measuring voltage transmitter as schematically indicated in FIG. 3. The oscillator means at the transmitted side and at the receiver side are indicated in FIG. 3, omitting individual switching or circuit elements, respectively by the oscillators 1, 9 and 26, 36, 41, while the remaining parts of FIGS. 1 and 2 are shown combined in block form.

According to this further feature of the invention, the heterodyne receiver has in the respective leads from the auxiliary oscillator 26 to the corresponding conversion stage 25 and from the interpolation oscillator 41 to the circuit arrangement 36 to 42, containing the auxiliary oscillator 36, a switch such as respectively indicated at S, such switches permitting in position 1 thereof an operation according to FIG. 2, while disconnecting in position 2 thereof the receiver oscillators 26 and 41 and substituting therefor, by way of connecting lines 53, 54 and preferably by way of separation amplifiers 55, 56, the transmitter oscillators 1 and 14. This switching feature provides a considerable advantage, namely, substituting for the main or rough tuning of the heterodyne receiver (by means of the auxiliary oscillator 26) and for the fine tuning (by means of the interpolation oscillator 41), a double synchronization between the transmitter and receiver, thereby making it possible to ready the entire arrangement for the selective voltage level measurement according to the invention, for measuring any desired measuring frequency, merely by actuating the main or rough tuning and the fine tuning on the transmitter side or on the receiver side, respectively.

The synchronizing circuit for the fine tuning also fulfills the requirement according to which the output frequency of the second transmitter oscillator 9 must differ frequency-wise from the output frequency of the auxiliary oscillator 36, provided in the receiver, by the amount of the second intermediate frequency appearing at the second conversion stage 35. It must be considered in this connection that the substitution of the interpolation oscillator 14 on the transmitter side, for the interpolation oscillator 41, in the synchronization of the fine tuning, determines merely the alteration of the output frequency of the auxiliary oscillator 36, while the absolute value of the output frequency depends upon the dimensioning of the circuit or switching elements 37 to 42 provided in the corrective tuning circuit.

The arrangement for the selective voltage output level measurement, in the embodiment so far described, serves for the continuous setting or adjustment of the measuring frequency, with very great accuracy and frequency constancy, either by proper adjustment of the oscillators 1 and 26 for the main or rough adjustment and of the oscillators 14 and 41 for the fine adjustment, or, by double synchronization between transmitter and receiver, merely by the adjustment of the oscillators 1, 14 and 26, 41, respectively. It may however be desired to cause the transmitter frequency to pass quickly and preferably automatically through the entire frequency range as is, for example, demanded in case of wobble operation. In such case, a switching-over may be effected in the "variable" transmitter oscillator part 1–7, such that the corrective tuning device 5 (FIG. 1) is disconnected from the low pass filter 6, receiving a direct voltage, so that the output frequency of the transmitter oscillator 1, although with somewhat diminished frequency constancy, depends now only upon the position of a tuning element, for example, a rotary capacitor. A wobbling of the measuring frequency can then be obtained by automatic variation of the adjustment over the entire adjusting range with unaltered setting of the interpolation oscillator 14. Assuming proper setting of the interpolation oscillator 41 in the heterodyne receiver, the main tuning is in such case suitably effected synchronously with the transmitter, for example, electrically by way of the connecting line 53 or by means of a mechanical coupling of the shafts of the tuning elements of the oscillators 1 and 26.

As a result of the elimination of the quartz stabilization of the "variable" transmitter oscillator part and of the auxiliary frequency of the first conversion stage 25 in the heterodyne receiver, and the attendant diminished frequency constancy, it is of advantage to switch over from the band pass filter 47 (FIG. 2) with extremely narrow pass range to a parallel connected band pass filter 46 with wider pass range.

In accordance with a further feature of the invention, there may be provided an automatic sharp tuning of the heterodyne receiver, whereby the intermediate frequency is held automatically within the center of the pass range of the band pass filters 47 and 46, respectively, thus avoiding a lateral frequency shifting in the range of the filter flanks which would result in undesired damping of the received frequency on the way to the evaluation device 50, 52. In the arrangement according to the invention, an automatic sharp tuning results moreover in the additional considerable advantage that the accuracy of the fine tuning, effected by the setting of the interpolation oscillator 41, can be further increased and that variations of the band pass filter characteristics produced, for example, by temperature influences and resulting in the same detrimental effects as undesired variations of the measuring frequency, can be excluded.

In accordance with this further feature of the invention, an auxiliary oscillator frequency, for example, $fq$, required for the frequency conversion of the intermediate frequency, is frequency modulated, preferably with a low wobble frequency $f_3$ (FIG. 4) with slight displacement, and the amplitude modulation of the intermediate frequency voltage appearing at the flanks of the band filters 47 and 46 is utilized so that the modulation frequency is derived and phase-wise compared with the preferably low wobble frequency $f_3$, so as to produce a polarized regulation voltage depending upon the direction of the phase shift, which is employed for the detuning of the oscillator in the sense of a shifting of the intermediate frequency in the direction of the center of the pass range of the band pass filter. Accordingly, the regulation voltage for the oscillator is derived from the frequency dependent course of the pass curve of the band pass filters 47 and 46, respectively.

Figure 4:
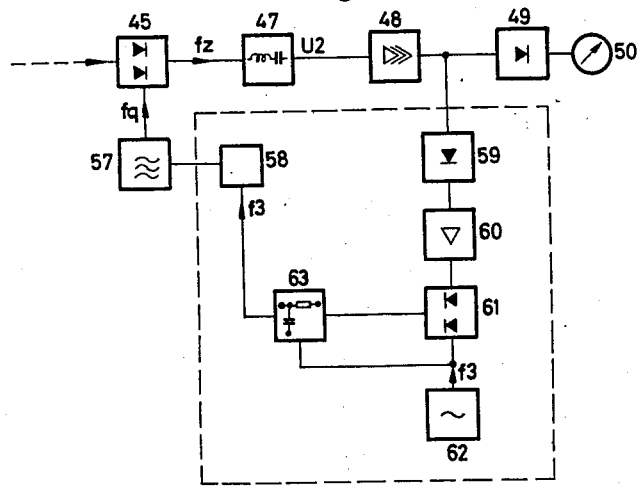
FIG. 4 represents a preferred switching arrangement for deriving the regulation voltage for the oscillator from the frequency-dependent course of the pass curve of the band pass filter.

A preferred circuit for this purpose is shown in FIG. 4, illustrating the part of the heterodyne receiver which extends from the modulator 45. The frequency $fq$ produced by the oscillator 57 which is conducted to the modulator 45 for the conversion of the intermediate frequency into a suitable frequency position, is thereby over a potential-wise controllable, frequency determining member 58 (for example, a reactance tube) of the oscillator 57 and a frequency gate 63, frequency modulated by an alternating voltage of low amplitude of the frequency $f_3$, coming from an alternating current source 62. The intermediate frequency $fz$ is correspondingly frequency modulated which may be expressed by the relation $$fz = fz_0 + \Delta f \cdot \cos \omega t$$

wherein $fz_0$ is the mean frequency, $\Delta f$ the frequency displacement, and $\omega$ the circuit frequency corresponding to the wobble frequency $f_3$. If $fz_0$ corresponds to the center frequency of the band pass filter 47 and if the modulation degree is such that the frequency displacement $\Delta f$ does not extend beyond the pass range of the filter 47, the amplitude of the filter output voltage U2 will not exhibit any change. However, upon shifting the mean intermediate frequency $fz_0$ into the range of the filler flanks, there will appear the frequency dependent damping of the filter 47, so that the filter output voltage U2 will in addition to the frequency modulation also contain an amplitude modulation $\Delta U2$ which depends upon the frequency displacement $\Delta f$ and the steepness of the flanks.

Figure 5:
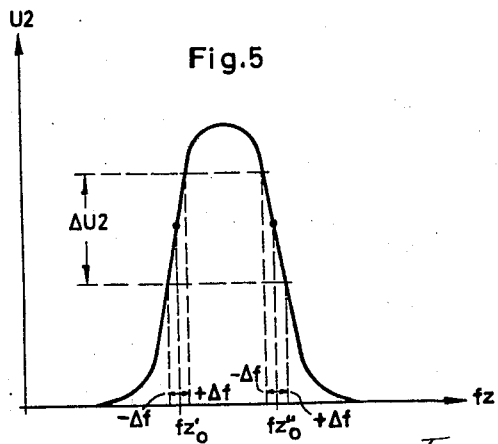
FIG. 5 shows the relationship between the momentary values of the intermediate frequency and the filter output voltage.

FIG. 5 shows the interrelationship between the momentary values of the intermediate frequency $fz$ and the filter output voltage U2. The output voltage U2 has a maximum value along the left filter flank at an assumed mean intermediate frequency $fz_0'$ when $fz = fz_0' + \Delta f$, and a maximum value along the right flank at a correspondingly shifted mean intermediate frequency $fz_0''$ when $fz = fz_0'' - \Delta f$. It will therefore be seen that the phase relation between frequency modulation and amplitude modulation of the intermediate frequency is upon transition of the mean intermediate frequency $fz_0$ from $fz_0'$ to $fz_0''$ or transition from one to the other filter flank, changed by 180°. This behavior is utilized for subsequent corrective tuning of the oscillator 57.

A demodulation arangement 59 derives from the intermediate frequency $fz$ which is amplified at 48, the modulation frequency, that is, the envelope of the intermediate frequency voltage $fz$, which is conducted by way of an amplifier arrangement 60 to the input of a phase dependent rectifier 61, to the second input of which is conducted the alternating voltage of low amplitude of the wobble frequency $f_3$. The phase dependent rectifier 61 thereupon becomes operative to produce a direct voltage which is polarized depending upon the direction of the phase shift of the alternating voltages on its inputs, and such direct voltage is by way of the frequency gate 63 conducted to the potential-wise controllable, frequency determining member 58 (for example, reactance tube) of the oscillator 57. The phase dependent rectifier 61 may, for example, be formed by a modulation arrangement, to which the output voltage of the amplifier 60 is as it were conducted as a signal voltage which is being switched in rhythm with the carrier frequency or switching frequency $f_3$. The frequency gate 63 preferably consists of an RC-member which is connected with the individual leads as indicated in FIG. 5.

Since the output voltage delivered by the amplifier arrangement 60 assumes, in accordance with the shifting of the mean intermediate frequency, upon the left or right flank of the band filter 47 a position which is phase shifted by 180° with respect to the output voltage with the frequency $f_3$, delivered by the alternating current source 62, there will be produced at the output of the phase dependent rectifier 61 a positive or negative direct voltage in place of the mean intermediate frequency $f_{z_0}'$ or $f_{z_0}''$. This direct voltage now acts by way of the frequency gate 63 upon the potential-wise controllable frequency determining member 58 (for example, reactance tube) of the oscillator 57, in the sense of a shifting of the mean intermediate frequency $f_{z_0}$ in the direction of the center of the pass range of the band filter 47.

Assuming proper dimensioning, the rectifier circuit 49 of the evaluation device of the superposing measuring receiver may thereby be used, in place of the demodulation arrangement 10, for deriving the modulation frequency. The alternating current source 62 may be substituted, preferably by an auxiliary winding of the commercial current transformer, so that the frequency $f_3$ corresponds in the superposing measuring receiver with the frequency of the commercial current.

It is also possible to connect the described auxiliary circuit for the automatic sharp tuning to the interpolation oscillator 41; in such case, the auxiliary oscillator voltage conducted to the second conversion stage 35 will be frequency modulated. However, the demodulation arrangement 59 must in such case again be connected in the path of the intermediate frequency voltage following the band filter 47.

The described auxiliary circuit is in its operation independent of the width of the band filter pass curve and may accordingly be used in connection with the band filter 47 with extremely narrow pass range and also in connection with the band filter 46.

The arrangement for the selective voltage level measurement according to the invention is in case of wobble operation preferably connected, instead of with the indicating device 50, with one pair of deflection electrodes of a two-coordinate recorder (especially cathode ray oscillograph), the other deflection electrode pair of which contains a deflection voltage which is proportional to the measuring frequency and derived from the measuring voltage, for example, by means of a frequency meter, at the place of location of the measuring receiver.

Changes may be made within the scope and spirit of the appended claims which define what is believed to be new and desired to have protected by Letters Patent.

We claim:

1. An arrangement for measuring the frequency characteristics of test objects forming parts of transmission systems, comprising a first oscillator for producing a first output signal the frequency of which is alternatively equal to any one of different harmonics of a quartz controlled basic frequency, a second oscillator for producing a second output signal the frequency of which is continuously tunable over a range of frequencies corresponding to the value of said quartz controlled basic frequency, a modulator, means for connecting the outputs of said first and of said second oscillator with the inputs of said modulator, filter means connected with the output of said modulator for filtering out the difference frequency of said output signals, means for connecting the output of said filter means with the input of a test object, a heterodyne receiver having a first and a second conversion stage, means for connecting the output of said test object with the input of said receiver, a first auxiliary oscillator, means for connecting one input of the first conversion stage with said first auxiliary oscillator, said first auxiliary oscillator producing a first auxiliary signal the frequency of which corresponds to the frequency of said first output signal, a second auxiliary oscillator, means for connecting one input of the second conversion stage with said second auxiliary oscillator, said second auxiliary oscillator producing a second auxiliary signal the frequency of which corresponds to the frequency of said second output signal increased by a predetermined value, band pass filter means having a pass range for accurately filtering out the output frequency of the second conversion stage, said output frequency being equal to said predetermined value, and means connected to the output of the said band pass filter means for measuring the amplitude of the output voltage and for producing an evaluation voltage corresponding thereto.

2. An arrangement according to claim 1, comprising corrective tuning branches for said second oscillator and said second auxiliary oscillator, each tuning branch comprising conversion means connected to the output of said second oscillator, said second auxiliary oscillator producing an intermediate low frequency from the output frequency of said second oscillator, an interpolation oscillator for producing an auxiliary low frequency which is continuously adjustable over a range of frequencies equal to the value of said quartz controlled basic frequency, phase indicating rectifier means connected to the output of said conversion means and to the output of said interpolation oscillator for comparing both output voltages with one another and for producing an output regulating voltage, the magnitude of which depends upon the frequency or phase difference between both said output voltages, and tuning means coupled to the output of said phase indicating rectifier means for adjusting the frequency of the output signals respectively of said second oscillator and said second auxiliary oscillator, the potential of said output regulating voltage diminishing as a result of said tuning action.

3. An arrangement according to claim 2, comprising switching means for disconnecting said first auxiliary oscillator from said first conversion stage and substituting therefor said first oscillator and for disconnecting the interpolation oscillator of said second auxiliary oscillator from said phase indicating rectifier means and substituting therefor the interpolation oscillator of said second oscillator.

4. An arrangement according to claim 1, comprising an automatic frequency control device for said first oscillator and for said first auxiliary oscillator, respectively, each automatic frequency control device comprising a quartz controlled generator for producing said quartz controlled basic frequency and a plurality of harmonics thereof, a modulation stage connected respectively to the output of said quartz controlled generator device and to the output of said first oscillator and said first auxiliary oscillator, a rectifier connected to the output of said modulation stage, a low pass filter connected to the output of said rectifier, a frequency determining member respectively for said first oscillator and said first auxiliary oscillator, coupled to the output of said low pass filter, the potential of said output voltage of said low pass filter diminishing as a result of said tuning action, means for disconnecting said frequency determining member from the output of said low pass filter, and means for continuously adjusting the output frequency respectively of said first oscillator and said first auxiliary oscillator.

5. An arrangement according to claim 4, comprising means for coupling said last named means with one another.

6. An arrangement according to claim 1, comprising a third conversion stage the input of which is connected to the output of said second conversion stage and the output of which is connected to the input of said band pass filter means, an auxiliary tunable oscillator connected to said third conversion stage, means for frequency modulating the output frequency of said auxiliary tunable oscillator, an alternating current source coupled to said means for frequency modulating, demodulating means connected to the output of said band pass filter, means for amplitude demodulating the output voltage of said band pass filter means, a phase dependent rectifier connected to the output of said demodulating means and to said alternating current source for comparing the output voltage of said demodulating means with the alternating voltage from said alternating current source and for producing an output regulating voltage, and means for coupling said output regulating voltage to said means for frequency modulating the output frequency of said auxiliary tunable oscillator.

References Cited in the file of this patent

UNITED STATES PATENTS

| | | |
|---|---|---|
| 2,530,596 | Blok | Nov. 21, 1950 |
| 2,752,565 | Van Weel | June 26, 1956 |
| 2,812,492 | Pfleger | Nov. 5, 1957 |

FOREIGN PATENTS

| | | |
|---|---|---|
| 1,032,390 | Germany | June 19, 1958 |